United States Patent [19]
Wang et al.

[11] Patent Number: 6,077,920
[45] Date of Patent: Jun. 20, 2000

[54] PROCESS FOR FEEDING PARTICULATE MATERIAL TO A FLUIDIZED BED REACTOR

[75] Inventors: Duan-Fan Wang, Somerville; Robert Lorenz Boysen, Lebanon; Leonard Sebastian Scarola, Union; Gary Harry Williams, Flemington, all of N.J.

[73] Assignee: Union Carbide Chemicals & Plastics Technology Corporation, Danbury, Conn.

[21] Appl. No.: 08/968,991

[22] Filed: Nov. 12, 1997

Related U.S. Application Data

[62] Division of application No. 08/760,187, Dec. 4, 1996, Pat. No. 5,763,541.

[51] Int. Cl.[7] .............................. C08F 2/00; C08F 10/00; C08F 36/00; C08F 20/44
[52] U.S. Cl. .............................. 526/88; 526/88; 526/282; 526/341; 526/335; 526/347.2; 526/348.7; 526/901
[58] Field of Search .............................. 526/88, 282, 341, 526/335, 347.2, 348.7, 901

[56] References Cited

U.S. PATENT DOCUMENTS

| | | |
|---|---|---|
| 4,994,534 | 2/1991 | Rhee et al. ................................ 526/88 |
| 5,453,471 | 9/1995 | Bernier et al. ............................ 526/68 |
| 5,556,238 | 9/1996 | Chinh ...................................... 406/136 |

OTHER PUBLICATIONS

Dr. Gerhard Kühner, Inorganic Chemical Products Division, Degussa AG, What is Carbon Black, pp. 1–40.

*Primary Examiner*—David W. Wu
*Assistant Examiner*—Tanya Zalukaeva
*Attorney, Agent, or Firm*—B. L. Deppenbrock

[57] ABSTRACT

The present invention provides a process and apparatus for feeding powders such as fine, cohesive, or powdery particulate materials from a low pressure system to a high pressure system. In a preferred embodiment a process and apparatus of pressurizing and feeding carbon black fluff to a polymerization reactor is provided particularly a gas phase fluidized polymerization reactor to provide for a close-coupling of a carbon black reactor to a polymerization reactor.

8 Claims, 1 Drawing Sheet

Figure 1  Pressurizing Vessel
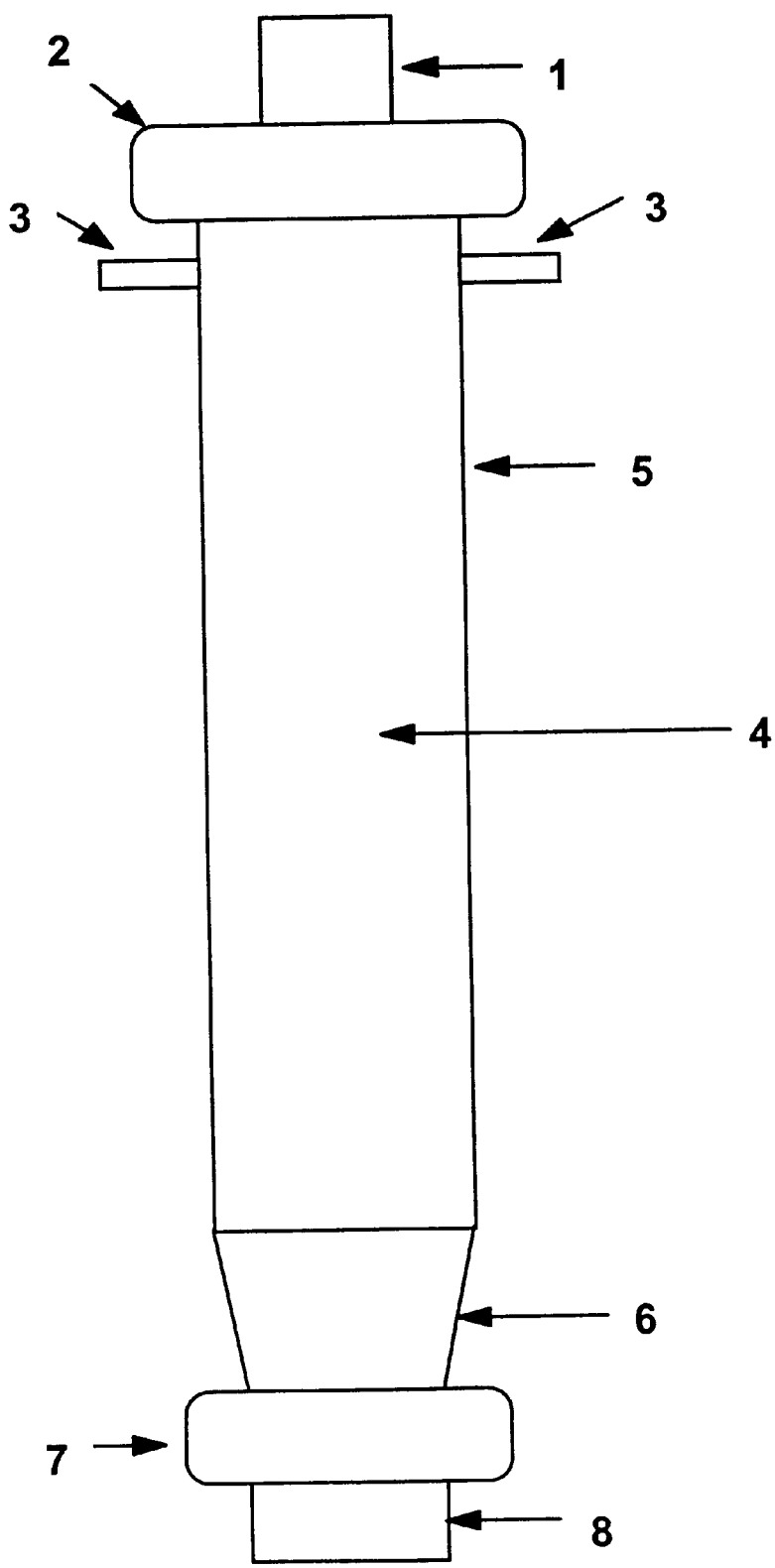

PROCESS FOR FEEDING PARTICULATE MATERIAL TO A FLUIDIZED BED REACTOR

This application is a Division of prior U.S. application Ser. No. 08/760,187 filed Dec. 4, 1996, now U.S. Pat. No. 5,763,541.

FIELD OF THE INVENTION

The present invention relates to a process and apparatus for feeding powders, especially cohesive, fine powders such as inert particulate materials, from a low pressure system to a high pressure system. More particularly, the present invention relates to a process and apparatus for close-coupling a carbon black reactor to a polymerization reactor during the polymerization of polymers, especially sticky polymers, to thereby feed carbon black "fluff" directly to a fluidized bed reactor such as gas phase reactor.

BACKGROUND OF THE INVENTION

Particulate materials, especially inert particulate materials such as carbon black, silca, clay, talc, and polymeric materials are employed as fluidization aids for polymerization of olefin polymers, especially sticky polymers, in fluidized bed reactors, especially gas phase fluidized bed reactors. In sticky polymers such as, for example, ethylene-propylene and ethylene-propylene-diene rubbers, carbon black is the most frequently employed particulate material. Such processes are taught, for example, in U.S. Pat. Nos. 4,994,534; 5,304,588; 5,317,036; and 5,453,471, as well as WO 95/09826 and WO 95/09827. These inert particulate materials or fluidization aids are manufactured as fine powdery cohesive solids which are then formed into beads or pellets for shipping and handling. Before they can be used in olefin polymerizations, they must be subjected to grinding, drying, purification, and/or passivation processes.

For example, carbon black is classified as a solid material and is developed initially in the form of an aerosol. For this reason, carbon black just formed has a flocculent appearance, which also gives rise to the expression "fluffy" carbon black or carbon black "fluff". The fluff form of carbon black is composed of more than 96% finely dispersed carbon with small amounts of oxygen, hydrogen, nitrogen, sulfur and traces (less than 0.5%) of organic components. The fluff form of carbon black poses difficulty in dispersing, handling, and transporting. The difficulty worsens when these processes are conducted under elevated pressures. Because of this, manufacturers of carbon blacks further process carbon black fluff to provide it to consumers in the form of dispersions, powders, beads, or pellets.

To convert carbon black fluff to beads, it is oxidatively after-treated. This after-treatment can produce carbon black beads containing up to 15% oxygen. After-treated carbon black typically contains higher amounts of other contaminants (e.g., hydrogen nitrogen, sulfur, moisture). Before carbon black beads are utilized in a polymerization process to produce polymers, the polymer manufacturer subjects them to a grinding process which in turn can introduce additional impurities such as moisture and traces of metals into the ground carbon black powder so produced. The polymer manufacturer uses carbon black powder in polymerization because it is a better fluidization aid than beads.

As those skilled in the art know, oxygen, moisture (water), as well as the other above-mentioned impurities (e.g., sulfur) found in carbon black or introduced in after-treatments, are considered to be poisons in polymerization processes such as those used to produce sticky polymers. The presence of these impurities in carbon black requires extensive drying and/or purifying and passivation operations before polymerization is initiated and/or the use of a scavenger material (typically, additional amounts of co-catalyst, e.g., aluminum-alkyls halides and/or hydrides), both of which are extremely costly steps in polymer production.

It would be desirable to efficiently utilize the fine, powdery form of a particulate material, especially the fluff form of carbon black, directly in a fluidized polymerization vessel. The feeding of particulate materials, especially inert particulate materials, such as carbon black fluff from a carbon black reactor directly to a fluidized reactor would eliminate the need for most, if not all, of the after-treatment provided by the supplier of carbon black, eliminate the need for grinding carbon black beads into powder by the polymer manufacturer, and reduce the amount of co-catalyst/scavenger material or passivation agent used in the polymerization by that amount which serves as a scavenger for impurities introduced by after-treatment and grinding. In addition, as compared to beads and powder, the smaller-sized carbon black fluff would improve fluidization in the polymerizing reactor, minimize or eliminate gel formation, and enhance overall reactor operability.

SUMMARY OF THE INVENTION

Accordingly, the present invention provides a process that close-couples a vessel which produces particulate material, especially inert particulate material, such as a carbon black in a carbon black reactor, to a polymer polymerization reactor such that inert material (e.g., carbon black fluff) is fed directly to a fluidized bed reactor during polymerization.

The present invention provides a process for feeding particulate material as a powder, especially a cohesive, fine powder or fluff, from a low pressure system (less than 300 psig) to a high pressure system (300 to 600 psig) comprising the steps of (i) introducing the material to one or more pressurizing vessels wherein each of the pressurizing vessels has a bottom bin opening to vessel diameter ratio equal to or larger than 0.2:1, preferably 0.65:1 to 1:1, and most preferably 0.85:1 to 1:1;

(ii) pressurizing the material in one or more of the pressurizing vessels to a pressure equal to or greater than that of the pressure of the high pressure system; and (iii) introducing the pressurized material from one or more of the pressurizing vessels into the high pressure system.

In a preferred embodiment, there is provided a process for feeding particulate material (e.g., carbon black fluff) to a polymerization reactor comprising the steps of:

(i) introducing the particulate material to one or more pressurizing vessels wherein each of the pressurizing vessels has a bottom bin opening to vessel diameter ratio equal to or larger than 0.2:1, preferably 0.65:1 to 1:1, and most preferably 0.85:1 to 1:1;

(ii) pressurizing the particulate material, preferably from the top of one or more of the pressurizing vessels, to a pressure equal to or greater than the pressure of the polymerization zone of the reactor; and (iii) introducing the pressurized particulate material from one or more of the pressurizing vessels into the polymerization reactor directly or into the cycle line and, thence, into the reactor.

In another preferred embodiment, there is provided a process for feeding carbon black fluff to a polymerization reactor comprising:

(i) pneumatically conveying carbon black fluff from a carbon black reactor in a gaseous media to a filtration system and optionally removing the gaseous media;

(ii) optionally introducing the filtered carbon black fluff to a purger to remove moisture and oxygen; and (iii) introducing the carbon black fluff to one or more pressurizing vessels wherein each of the pressurizing vessels has a bottom bin opening to vessel diameter ratio equal to or larger than 0.2:1, preferably 0.65:1 to 1:1, most preferably 0.85:1 to 1:1;

(iv) pressurizing the carbon black fluff in one or more pressurizing vessels to a pressure equal to or greater than the pressure of the polymerization zone of the reactor; and (v) introducing the pressurized carbon black fluff from one or more of the pressurizing vessels into the reactor directly or into the reactor cycle line and, thence, into the reactor.

In still another embodiment there is also provided a process for producing a polymer in a gas fluidized bed reaction vessel having a polymerization zone containing a bed of growing polymer particles under polymerization conditions in the presence of a catalyst which comprises:

(i) continuously or intermittently introducing one or more monomers and optionally at least one inert gas into the polymerization zone;

(ii) continuously or intermittently introducing one or more particulate materials into the reaction vessel in accordance with any of the procedures set forth above;

(iii) continuously or intermittently withdrawing polymeric product from the reaction vessel; and (iv) continuously withdrawing unreacted monomers and gases from the polymerization zone. And, optionally in step (iv), the gases can be compressed and cooled optionally while maintaining the temperature within the polymerization zone below the dew point of at least one monomer present in the polymerization zone.

There is also provided an apparatus (i.e., a pressurizing vessel) for pressurizing and feeding cohesive material, especially powdery, fluffy material, which apparatus comprises a cylindrical vessel having a bottom hopper with a half bin angle larger than 45 degrees, preferably 45 to 90 degrees, from horizontal and having a bottom hopper opening to vessel diameter ratio equal to or larger than 0.2:1, preferably 0.65:1 to 1:1 and most preferably 0.85:1 to 1:1; a solids inlet disposed in the upper portion of the vessel; an air-tight valve in the upper portion of the vessel; an air-tight valve in the lower portion of the vessel; a solids discharge disposed in the lower portion of the vessel; and gas entry means, preferably disposed in the upper portion of the vessel.

The apparatus of the present invention is used to feed any powders or particulate material, for example, powdery inert particulate materials such as carbon black, silica, talc, clays, or polymeric material. In a preferred aspect, the apparatus of the present invention is directed to pressurizing and feeding carbon black fluff.

BRIEF DESCRIPTION OF THE DRAWING

FIG. 1 is a representation of a preferred pressurizing vessel or apparatus of the present invention. In FIG. 1, 1 is an inlet conduit for solids entering the vessel for pressurizing; 2 is an air-tight valve; 3 is a conduit for entering pressurization gas; 4 is a cylindrical vessel; 5 is a straight column; 6 is a bottom hopper; 7 is an air-tight valve; and 8 is a discharge conduit.

DETAILED DESCRIPTION OF THE INVENTION

Polymers. Illustrative of the polymers which can be produced in accordance with the process and apparatus of the invention are the following: homopolymers and copolymers of $C_2$–$C_{18}$ alpha olefins; ethylene propylene rubbers (EPRs); ethylene-propylene diene rubbers (EPDMs); polyisoprene; polystyrene; polybutadiene; polymers of butadiene copolymerized with styrene; polymers of butadiene copolymerized with isoprene; polymers of butadiene copolymerized with acrylonitrile; polymers of isobutylene copolymerized with isoprene; ethylene butene rubbers and ethylene butene diene rubbers; polychloroprene; norbornene homopolymers and copolymers with one or more $C_2$–$C_{18}$ alpha olefin; terpolymers of one or more $C_2$–$C_{18}$ alpha olefins with a diene; and the like.

Polymerization. The process of the present invention can be used in conjunction with slurry, solution, bulk, and fluidized (stirred and/or gas phase) polymerizations. Preferably, it is employed in fluidized polymerizations, most preferably those utilizing a gas phase. The present invention is not limited to any specific type of fluidized or gas phase polymerization reaction and can be carried out in a single reactor or multiple reactors (two or more reactors in series). In addition to well known conventional gas phase polymerizations processes, "condensed mode", including the so-called "induced condensed mode", and "liquid monomer" operation of a gas phase polymerization can be employed.

A conventional fluidized bed process for producing resins is practiced by passing a gaseous stream containing one or more monomers continuously through a fluidized bed reactor under reactive conditions in the presence of a polymerization catalyst. Product is withdrawn from the reactor. A gaseous stream of unreacted monomer is withdrawn from the reactor continuously and recycled into the reactor along with make-up monomer added to the recycle stream. Conventional gas phase polymerizations are disclosed, for example, in U.S. Pat. Nos. 3,922,322 and 4,035,560.

Condensed mode polymerizations are disclosed in U.S. Pat. Nos. 4,543,399; 4,588,790; 5,352,749; and 5,462,999. Condensing mode processes are employed to achieve higher cooling capacities and, hence, higher reactor productivity. In these polymerizations a recycle stream, or a portion thereof, can be cooled to a temperature below the dew point in a fluidized bed polymerization process, resulting in condensing all or a portion of the recycle stream. The recycle stream is returned to the reactor. The dew point of the recycle stream can be increased by increasing the operating pressure of the reaction/recycle system and/or increasing the percentage of condensable fluids and decreasing the percentage of non-condensable gases in the recycle stream. The condensable fluid may be inert to the catalyst, reactants and the polymer product produced; it may also include monomers and comonomers. The condensing fluid can be introduced into the reaction/recycle system at any point in the system. Condensable fluids include saturated or unsaturated hydrocarbons. In addition condensable fluids of the polymerization process itself other condensable fluids, inert to the polymerization can be introduce to "induce" condensing mode operation. Examples of suitable condensable fluids may be selected from liquid saturated hydrocarbons containing 2 to 8 carbon atoms (e.g., ethane, propane, n-butane, isobutane, n-pentane, isopentane, neopentane, n-hexane, isohexane, and other saturated $C_6$ hydrocarbons, n-heptane, n-octane and other saturated $C_7$ and $C_8$ hydrocarbons, and mixtures thereof). Condensable fluids may also include polymerizable condensable comonomers such as olefins, alpha-olefins, diolefins, diolefins containing at least one alpha olefin, and mixtures thereof. In condensing mode, it is desirable that the liquid entering the fluidized bed is dispersed and vaporized quickly.

Liquid monomer polymerization mode is disclosed, in U.S. Pat. No. 5,453,471, U.S. Ser. No. 510,375 filed on Aug. 2, 1995, now U.S. Pat. No. 5,834,571, PCT 95/09826 (US) and PCT 95/09827 (US). When operating in the liquid monomer mode, liquid can be present throughout the entire polymer bed provided that the liquid monomer present in the bed is adsorbed on or absorbed in solid particulate matter present in the bed, such as polymer being produced or fluidization aids (e.g., carbon black) present in the bed, so long as there is no substantial amount of free liquid monomer present more than a short distance above the point of entry into the polymerization zone. Liquid mode makes it possible to produce polymers in a gas phase reactor using monomers having condensation temperatures much higher than the temperatures at which conventional polyolefins are produced. In general, a liquid monomer process is conducted in a stirred bed or gas fluidized bed reaction vessel having a polymerization zone containing a bed of growing polymer particles. The process comprises continuously introducing a stream of one or more monomers and optionally one or more inert gases or liquids into the polymerization zone; continuously or intermittently introducing a polymerization catalyst into the polymerization zone; continuously or intermittently withdrawing polymer product from the polymerization zone; and continuously withdrawing unreacted gases from the zone; compressing and cooling the gases while maintaining the temperature within the zone below the dew point of at least one monomer present in the zone. If there is only one monomer present in the gas-liquid stream, there is also present at least one inert gas. Typically, the temperature within the zone and the velocity of gases passing through the zone are such that essentially no liquid is present in the polymerization zone that is not adsorbed on or absorbed in solid particulate matter.

Monomers. Monomers that can be employed in the process can include one or more: $C_2$ to $C_{18}$ alpha olefins such as ethylene, propylene, and optionally at least one diene (such as those taught in U.S. Pat. No. 5,317,036 to Brady et al.), for example, hexadiene, dicyclopentadiene, octadiene, norbornadiene, and ethylidene norbornene; readily condensable monomers such as those taught in U.S. Pat. No. 5,453,471 including isoprene, styrene, butadiene, isobutylene, chloroprene, acrylonitrile, cyclic olefins such norbornenes, and the like.

Catalysts. Any type of polymerization catalyst may be used in the polymerization process. A single catalyst may be used, or a mixture of catalysts may be employed, if desired. The catalyst can be soluble, or insoluble, supported or unsupported. It may be a prepolymer, spray dried with or without a filler, a liquid, or a solution, slurry or dispersion. These catalysts are used with cocatalysts and promoters well known in the art. Typically these are aluminum-alkyls, halides, as hydrides and well as aluminoxanes. For illustrative purposes only, examples of suitable catalysts include:

A. Ziegler-Natta catalysts, including titanium based catalysts such as those described in U.S. Pat. Nos. 4,376,062 and 4,379,758. Ziegler-Natta catalysts are well known in the art, and typically are magnesium/titanium/electron donor complexes used in conjunction with an organoaluminum cocatalyst.

B. Chromium based catalysts such as those described in U.S. Pat. Nos. 3,709,853; 3,709,954; and 4,677,904.

C. Vanadium based catalysts such as vanadium oxychloride and vanadium acetylacetonate, such as described in U.S. Pat. No. 5,317,036.

D. Metallocene catalysts and other single-site or single-site-like catalysts such as those taught in U.S. Pat. Nos. 4,530,914; 4,665,047; 4,752,597; 5,218,071; 5,272,236; 5,278,272; 5,317,036; and 5,527,752.

E. Cationic forms of metal halides, such as aluminum trihalides.

F. Cobalt catalysts and mixtures thereof such as those described in U.S. Pat. Nos. 4,472,559 and 4,182,814.

G. Nickel catalysts and mixtures thereof such as those described in U.S. Pat. Nos. 4,155,880 and 4,102,817.

H. Rare earth metal catalysts, i.e., those containing a metal having an atomic number in the Periodic Table of 57 to 103, such as compounds of cerium, lanthanum, praseodymium, gadolinium and neodymium. Especially useful are carboxylates, alcoholates, acetylacetonates, halides (including ether and alcohol complexes of neodymium trichloride), and allyl derivatives of such metals, e.g., of neodymium. Neodymium compounds, particularly neodymium neodecanoate, octanoate, and versatate, and n-alkyl neodymium are the most preferred rare earth metal catalysts. Rare earth catalysts are especially preferred and used to produce polymers polymerized using butadiene, styrene, or isoprene and the like.

Preferred catalysts for the process of the present invention include rare earth metal catalysts, titanium catalysts, vanadium catalysts, and the metallocene/single-site/single-site-like catalysts.

Carbon Black Fluff and Process of Feeding of It. It is understood that in the present invention, other inert particulate materials or mixtures of them are employed as described for carbon black. Such inert particulate materials can include carbon black, silica, talc, clay, polymeric materials, and mixtures thereof. These materials are described in U.S. Pat. No. 4,994,534. Of these, carbon black, silica, and mixtures of carbon black and silica are preferred, with carbon black being most preferred.

Carbon black fluff produced in a carbon black reactor has a primary particle size of about 10 to about 500 nanometers, an average size of aggregate of about 0.1 to about 10 microns, and a specific surface area of about 30 to about 1,500 $m^2$/gm. The carbon black fluff produced by grinding carbon black beads has an average particle size ranging from about 0.1 microns to about 20 microns, preferably about 0.1 to 10 microns. Carbon black fluff has a bulk density ranging from about 2 to about 10 $lb/ft^3$, preferably about 2 to about 6 $lb/ft^3$.

In order to produce carbon black, air and/or natural gas are introduced into a carbon black reactor to mix and burn with oil sprayed into the reactor. The type of process employed to produce carbon black is not critical and can be one or more of the following: a furnace black process, a gas black process, or a thermal black process.

A large amount of process gas is generated as a by-product in the production of carbon black. It can be used to pneumatically convey carbon black fluff from the carbon black reactor to a bag filter system where carbon black fluff is separated or filtered from the process gas or gaseous media as used herein. The process of pneumatically conveying carbon black fluff from a carbon black reactor to a filtration system is well known and routinely practiced by carbon black manufacturers and is adopted by the present invention.

Optionally, the filtered carbon black fluff is gravity fed to a purger to remove moisture and oxygen. This purging step is required when carbon black fluff is produced using a process (e.g., a furnace black process) that injects water to quench the process gas/carbon black mixture after the reaction to suppress detrimental secondary reactions. A commercially available fluidized bed dryer is used in the present invention as the purger. This does not imply that the fluidized bed dryer is the only technology can be applied in this invention. Any commercially available drying equipment can be used. It can be a purge tank, a tumbler, or other readily available equipment. Inert gas (nitrogen, argon, alkanes), preferably nitrogen, is injected into the fluidized bed dryer or purging equipment to remove moisture and oxygen trapped between carbon black particles. A batch process is used in this invention, although a continues process is also applicable and preferred.

The amount of purge gas injected into a carbon black purger can range from the amount that is equal to the volume of the interstitial space between the carbon black fluff to an amount that is ten or more times the total volume of the bulk of carbon black fluff in the purger. In the present invention it is preferred to purge the carbon black fluff prior to pressurizing by injecting an amount of purge gas equal to one to five times, preferably about three times the volume of the carbon black fluff in the dryer.

The purged carbon black fluff is gravity fed into a pressurizing vessel to be pressurized and then blown or shunted into the reactor. It is known in the industry that when carbon black fluff is pressurized it is easily packed into a solid mass. Once the solid mass is formed, it is very difficult to be discharged or fed out of the pressurizing vessel. This is the main reason why carbon black reactors have not been previously close-coupled to a polymerization reactor. The strength of the solid mass of pressurized carbon black is proportional to the pressure to which the carbon black fluff is pressurized and is inversely proportional to the duration of the pressurization time. To minimize packing carbon black fluff, most of carbon black handling methods previously developed by the industry are for handling carbon black at low pressures, 50 psig or lower, and their pressurization time is often half an hour or more. Unfortunately, these methods are not applicable to feed carbon black fluff to a fluidized bed polymerization reactor because the desired method should be able to pressurize and feed the carbon black fluff at the pressure of the reactor which is generally about 300 to 600 psig, and to complete the pressurization stage within a short period of time, preferably less than 5 minutes.

To successfully pressurize and feed carbon black fluff into a gas phase polymerization reactor, the present invention develops a new pressurizing and feeding method. This new method has two unique features: (1) the pressurization gas is introduced from the top of the pressurizing vessel and (2) the size of the bin opening at the bottom bin of the pressurizing vessel is equal to or at least 20 percent, preferably at least 65 percent, and most preferably at least 85 percent, of the diameter of the vessel. That is, pressure is applied by adding a given volume of pressurizing gas, which can be an inert gas (e.g., nitrogen, argon, alkanes) or cycle gas of the reaction system, above the top surface of the carbon black fluff in the pressurizing vessel. And the opening at the lower end of the bin is wide, at least 20 percent, preferably 65 percent or more, of the diameter of the pressurizing vessel.

The FIGURE depicts a desirable pressurizing vessel for the process of the invention. Referring to FIG. 1, a cylindrical pressurizing vessel 4 is shown which is provided with an entry means such as inlet conduit 1 for solids (e.g., carbon black fluff) which must be pressurized and which is introduced into the vessel by gravity. The bottom hopper 6 is connected to the straight column 5 and has its bottom opening to the diameter of column 5 ratio equal to or greater than 0.2:1, typically 0.2:1 to 1:1, preferably 0.65:1 to 1:1 and most preferably 0.85:1 to 1:1. Pressurization gas is introduced through gas inlet conduit 3, which is located at the upper part of the vessel 4. Pressure inside the vessel 4 is maintained by closing air-tight valves 2 and 7. The opening of valve 7 is equal to the opening of the bottom hopper 6. At the end of pressurization, the valve 7 is opened and solids are discharged through the discharge conduit 8. The diameter of the discharge conduit 8 is equal to or larger than the opening of valve 7.

The reason for pressurizing carbon black fluff preferably from the top of the pressurizing vessel 4 through the conduit 3 is that the pressurization gas is utilized to act like an invisible piston that compresses carbon black fluff into a slug or semi-solid mass against the bottom hopper 6 and valve 7. When the valve 7 is opened or released at the end of pressurization, the pressurization gas pushes the compressed carbon black mass out of the pressurization vessel 4 and into the polymerization reactor directly or into the recycle line and thence into the polymerization reactor.

The compressed carbon black mass can not be completely pushed out of a pressurizing vessel if the size of the hopper opening at the bottom of the pressurizing vessel is much smaller or narrower than the diameter of the vessel. It is observed that "rat-holes" are developed through the compressed carbon black mass and only the portion of carbon black that is packed against the discharge valve is discharged when the discharge valve is opened to the polymerization reactor or recycle line. As used herein a rat-hole is a hole formed inside a bin when the flowing central plug of material is removed and the side material remains. On the other hand, when a pressurizing vessel with the size of the bottom hopper opening close to the vessel diameter, such as the pressurizing vessel 4, carbon black fluff in the pressurizing vessel is compressed to a solid mass which has a diameter close to the size of the hopper opening. When the discharge valve 7 is opened, there is little obstacle or resistance in the passage of the compressed carbon black mass, thus discharging the compressed carbon black mass completely. The ratio of the opening of the bottom hopper 6 to the diameter of the column 5 is dependent upon the magnitude of pressurization desired. The higher the pressurization pressure is, the higher the ratio should be. In the case of pressurizing the carbon black fluff to 300 to 600 psig, the opening of the bottom hopper 6 is preferred to be at least about 65 percent, most preferably between about 85 and 100 percent, of the diameter of the column 5. The half angle of the bottom hopper 6 is not critical when the opening of the bottom hopper 6 is close to the diameter of the column 5; however, it is preferred that the half angle of the bottom hopper 6 is greater than about 45 degrees from horizontal. With the opening of the bottom hopper 6 close to the diameter of the column 5 and with a steep bottom hopper 6, the pressurizing vessel 4 often looks like a straight tube; therefore, the new pressurizing and feeding method proposed by the present invention is also called the shot-tube method. It is preferred to use a plurality of pressurizing vessel connected to the polymerization reactor such that when some are loading and/or pressurizing, others are timed to deliver pressurized carbon black (solid mass or slug) to the reactor and/or cycle line.

The compressed carbon black fluff can be fed simultaneously or intermittently directly into the reactor or into the cycle line of the reaction system. Or, alternatively, fluff can be fed simultaneously or intermittently into both the reactor and cycle line. Inside the reactor or the cycle line, the compressed carbon black explodes into loose fluff due to the pressure difference between the pressure to which the carbon black is pressurized and the pressure of the reactor or the cycle line, or it is broken back to fluff by attrition inside the reactor or the cycle line. Typically, the pressure difference between the carbon black reactor and/or pressurizing vessel and the pressure in the polymerization reactor is between about 5–1500 psig, preferably about 200–650 psig. When it is fed directly to the reactor, it can be fed to the top, bottom or side. Preferably, it is side fed into the polymerization zone of the reactor or vessel, most preferably at or in the vicinity of the top of the zone.

Particulate Materials. The pressurizing and feeding process developed by the invention is not limited to feeding carbon black fluff. It can be employed to feed one or more other particulate materials or fluidization aids alone or even in combination with carbon black fluff. These inert particulate materials can include silica, talc, and clays, as well as inert polymeric materials. Silica has a primary particle size of about 5 to about 50 nanometers, an average size of aggregate of about 0.1 to about 10 microns, and a specific surface area of about 50 to 500 $m^2/gm$. Clay, talc, and polymeric materials have an average particle size of about 0.01 to about 10 microns and a specific surface area of about 3 to 30 $m^2/gm$. These inert particulate materials, as is carbon black, are employed in amounts ranging about 0.3 to about 80%, preferably about 5 to about 50%, based on the weight of the final product. Of these materials, carbon black, silica, and mixtures of them are particularly preferred. They are especially useful for the polymerization of sticky polymers as disclosed in U.S. Pat. Nos. 4,994,534 and 5,304,588 and of polymers prepared in liquid monomer mode.

Other Additives. Some compounds may be used to neutralize static in the fluidized-bed reactor, others known as drivers rather than antistatic agents, may consistently force the static to from positive to negative or from negative to positive. These methods of static control and compounds for controlling static are disclosed, for example, in U.S. Pat. Nos. 4,792,592; 4,803,251; 4,855,370; 4,876,320; 5,162,463; 5,194,526; 5,200,477 and 3,391,477. The use of these additives is well within the skill of those skilled in the art. These additives may be added to the reaction zone separately or in combination with one or more of the other reactants (monomers, fluidization aids, chain transfer agent, recycle gas, etc.).

Fouling of the recycle lines can be effectively controlled or halted by introducing veratrole (1,2-dimethoxy benzene), methanol, tetrahydrofuran, or propylene glycol into the recycle lines at compressor junction in the reactor system. Reduction of fouling of the cycle gas line, compressor, and cycle gas cooler can typically be accomplished using a feed rate of about 5 lb/hr of a 0.1 wt % solution in isopentane.

All references cited herein are incorporated by reference.

Whereas the scope of the invention is set forth in the appended claims, the following specific examples illustrate certain aspects of the present invention. The examples are set forth for illustration only and are not to be construed as limitations on the invention, except as set forth in the claims. All parts and percentages are by weight unless otherwise specified.

EXAMPLE 1 (COMPARATIVE)

This example demonstrates the difficulty of pressurizing and feeding carbon black fluff out of a conventional pressurizing vessel.

Twelve pounds of carbon black fluff (bulk density equal to 4 $lb/ft^3$) were loaded into a pressurizing vessel, which had the length equal to 32 inches, the inside diameter equal to 18 inches, the half angle of the discharge end equal to 60 degrees from horizontal, and the size of the bottom opening equal to 1.5 inches. The ratio of the bin opening to the diameter of the vessel was 0.0833. The vessel was pressurized to 30 psig with compressed air. The compressed air was introduced into the pressurizing vessel through an injection port at the bottom of the vessel.

After pressurization, the discharge valve was opened. Around 50 percent of carbon black fluff was discharged. The rest of carbon black fluff remained inside the vessel. Ratholes had developed inside the vessel.

EXAMPLE 2

This example demonstrates that carbon black fluff was successfully pressurized and discharged using the pressurizing and feeding method developed by the present invention.

The pressurizing vessel was 48 inches long with an inner diameter equal to 3.25 inches. A 3-inch full-port ball valve, with 2.75-inch opening, was used as the discharge valve. The ratio of the bin opening to the diameter of the vessel was 0.85. A half pound of carbon black fluff (bulk density equal to 4 $lb/ft^3$) was loaded into the tube. Pressurization air was introduced from the top of the vessel through a divert pipe. The pressurization air compressed the carbon black fluff into a slug against the discharge valve. The bed height of the carbon black fluff decreased more than 50% of its original bed height. The carbon black fluff was pressurized to 100 psig.

After pressurization, the discharge valve was opened. The slug or mass of the compressed carbon black fluff was completely pushed out of the pressurizing vessel.

EXAMPLE 3

This example demonstrates the pressurizing and feeding method of the invention is used to successfully discharge and feed pressurized carbon black fluff out of the pressurizing vessel into the polymerization reactor, thus providing the process for close-coupling a carbon reactor to a gas phase polymerization reactor.

An ethylene/propylene/ethylidene norbornene terpolymer (EPDM) was prepared using the gas phase process disclosed in U.S. Pat. No. 4,994,534. The production rate of the polymerization reactor is 35,000 lb/h. Carbon black fluff (bulk density equal to 4 $lb/ft^3$) is used as the fluidization aid.

A carbon black reactor is close-coupled to the polymerization reactor. Carbon black fluff (9,300 lb/h) produced in the carbon black reactor is pneumatically conveyed by the process gas from the carbon black reactor to a bag filter system. Carbon black fluff is separated from the process gas through the filter bags and is gravity fed into a purge tank. Nitrogen (500 lb/h), which is equal to three times the volume of the carbon black fluff in the purge tank, is used to remove moisture and oxygen from carbon black fluff. Purged carbon black is gravity loaded into six pressurizing vessels, adjoining the polymerization reactor at its polymerization zone (between the bottom grid and the upper entrainment section) of the reactor. The diameter of each of the pressurizing vessels is 16 inches, and the length of the vessel is 10 feet. A 16-inch full-port ball valve is used at the bottom of each pressurizing vessel as the discharge valve.

The cycle gas of the reaction system is used to pressurize the carbon black fluff in the pressurizing vessel to 600 psig, the pressure of the reactor. High pressure nitrogen is used to further pressurize the carbon black fluff to 615 psig. The 15 psig pressure difference between the pressurizing vessel and the reaction system ensures the pressurized carbon black being discharged from the vessel.

At the end of pressurization, the discharge valve of the pressurizing vessel is opened and the pressurized carbon black fluff is fed into the cycle line of the reaction system and is carried into the reactor by the cycle gas. Inside the cycle line, the compressed carbon black pops back to loose fluff due to the pressure difference between the pressure to which the carbon black is pressurized and the pressure of the cycle line, or it is broken back to fluff by attrition inside the cycle line. Since it takes one and a half minutes to load, pressure, and feed carbon black fluff, the six pressurizing vessels are grouped into three pairs. Every 30 seconds one pair of pressurizing vessels are used to feed carbon black, while the remaining pairs are being loaded with carbon black and pressurized with the cycle gas and nitrogen, respectively.

What is claimed is:

1. A process for feeding a particulate material to a polymerization reactor comprising
   (i) introducing the particulate material to one or more pressurizing vessels wherein each of the pressurizing vessels has a bottom hopper opening to vessel diameter ratio equal to or larger than 0.2:1;
   (ii) pressurizing the particulate material in one or more of the pressurizing vessels to a pressure equal to or greater than the pressure of polymerization zone of the reactor with a pressurization gas introduced from above the top surface of the particulate material to form a compressed mass of particulate material; and
   (iii) introducing the compressed mass of particulate material from one or more of the pressurizing vessels into the polymerization reactor directly or into the cycle line and, thence, into the reactor.

2. The process according to claim 1 wherein the particulate material is carbon black fluff and further comprising:
   (i) pneumatically conveying carbon black fluff from a carbon black reactor in a gaseous media to a filtration system and optionally removing the gaseous media;
   (ii) optionally introducing the filtered carbon black fluff to a purger to remove moisture and oxygen;
   (iii) introducing the carbon black fluff to said one or more pressurizing vessels;
   (iv) pressurizing the carbon black fluff in said one or more pressurizing vessels with said pressurizing gas to form a compressed mass; and
   (v) introducing the compressed mass of carbon black fluff from said one or more of the pressurizing vessels (a) into the reactor directly (b) into the reactor cycle line, and thence, into the reactor, or (c) into both the reactor and the cycle line simultaneously.

3. The process according to claim 2 wherein each of the pressurizing vessels has a bottom hopper opening to vessel diameter ratio of 0.65:1 to 1:1 and wherein the carbon black fluff is pressurized from the top of one or more of the pressurizing vessels.

4. A process for producing a polymer in a gas fluidized bed reaction vessel having a polymerization zone containing a bed of growing polymer particles under polymerization conditions in the presence of a catalyst which process comprises:
   (i) continuously or intermittently introducing one or more monomers and optionally at least one inert gas into the polymerization zone;
   (ii) continuously or intermittently introducing one or more particulate materials into the reaction vessel in accordance with the procedure of claim 1;
   (iii) continuously or intermittently withdrawing polymeric product from the reaction vessel; and
   (iv) continuously withdrawing unreacted monomers and gases from the polymerization zone.

5. The process of claim 4 wherein in step (iv), said unreacted monomers and gases are compressed and cooled optionally while maintaining the temperature within the polymerization zone below the dew point of at least one monomer present in the polymerization zone.

6. The process of claim 4 wherein the polymer produced by the process is selected from the group consisting of homopolymers and copolymers of $C_2$–$C_{18}$ alpha olefins, ethylene propylene rubbers; ethylene-propylene diene rubbers; polyisoprene; polystyrene; polybutadiene; polymers of butadiene copolymerized with isoprene; polymers of isoprene copolymerized with styrene; polymers of butadiene copolymerized with styrene; polymers of butadiene copolymerized with acrylonitrile; polymers of isobutylene copolymerized with isoprene; ethylene butene rubbers and ethylene butene diene rubbers; polychloroprene, norbornene homopolymers and copolymers with one or more $C_2$–$C_{18}$ alpha olefins; terpolymers of $C_2$–$C_{18}$ alpha olefins and a diene.

7. The process according to claim 1 wherein the particulate material is an inert particulate material selected from the group consisting of carbon black, silica, clay, talc, polymeric material, and mixtures thereof.

8. The process according to claim 7 wherein the inert particulate material is selected from the group consisting of carbon black, silica, and mixtures thereof.

* * * * *